United States Patent

[11] 3,627,146

| [72] | Inventor | Siegfried Berndt<br>Solingen, Germany |
|---|---|---|
| [21] | Appl. No. | 66,740 |
| [22] | Filed | Aug. 25, 1970 |
| [45] | Patented | Dec. 14, 1971 |
| [73] | Assignee | Th. Kieserling & Albrecht<br>Solingen, Germany |
| [32] | Priority | Sept. 9, 1969 |
| [33] | | Germany |
| [31] | | P 19 45 524.4 |

[54] APPARATUS FOR SIDEWISE TRANSPORT OF TUBES OR THE LIKE
10 Claims, 1 Drawing Fig.

[52] U.S. Cl. ..................................... 214/1 P, 198/210, 214/1 BD
[51] Int. Cl. ..................................... B65g 29/02
[50] Field of Search ........................... 214/1 P, 1 PB, 1 BD, 1 R; 198/210

[56] References Cited
UNITED STATES PATENTS

| 2,528,860 | 11/1950 | Clark | 198/210 X |
|---|---|---|---|
| 3,319,805 | 5/1967 | Brauer | 214/1 BD |

FOREIGN PATENTS

| 314,824 | 8/1956 | Switzerland | 198/210 |

Primary Examiner—Albert J. Makay
Assistant Examiner—Frank E. Werner
Attorney—Michael S. Striker ABSTRACT: Apparatus for sidewise transport of tubes wherein a disk rotating with a horizontal shaft supports several transfer units each having a claw fixed to the disk and a second claw a portion of which is movable toward and away from the fixed claw in response to rotation of the carrier. The second claw is biased against the tube between the two claws by a spring which is stressed in response to engagement of the second claw with a tube and is permitted to dissipate energy when the second claw moves away from the first claw. In this way, the spring is not under substantial stress when the respective transfer unit does not transport a tube.

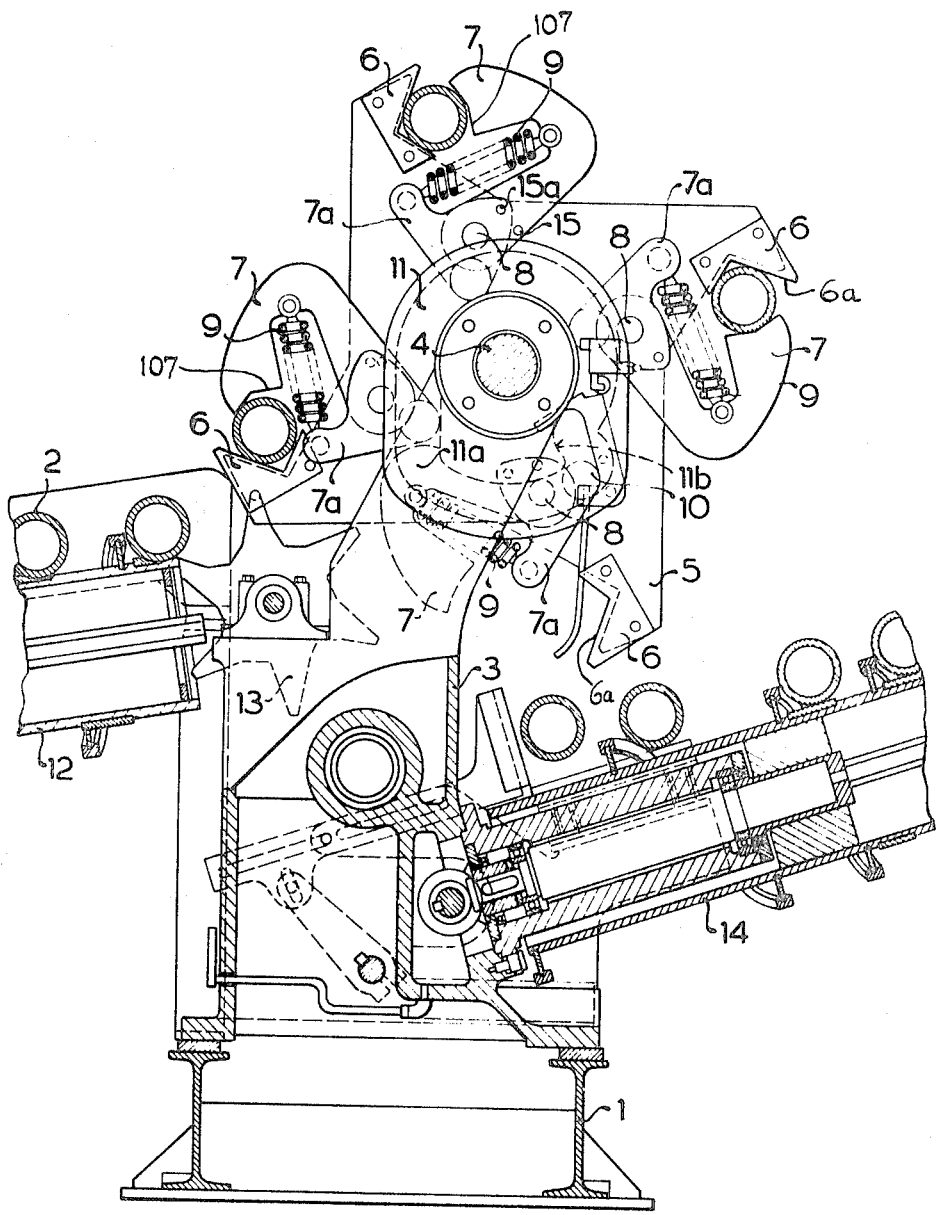

APPARATUS FOR SIDEWISE TRANSPORT OF TUBES OR THE LIKE

BACKGROUND OF THE INVENTION

The present invention relates to improvements in apparatus for the transport of tubes or analogous elongated workpieces, and more particularly to improvements in apparatus for sidewise transport of such workpieces.

It is already known to employ in transporting apparatus for tubes or the like a horizontal drive shaft which supports several axially spaced disks for one or more transfer units having pairs of cooperating claws which move toward each other to engage a tube in a first angular position of the shaft and release the tube in a second angular position of the shaft. One of the claws is biased toward the other claw by one or more springs which must be stressed in order to move the one claw away from the other claw. Thus, whenever the claws of a transfer unit are open, the springs must be maintained under considerable stress with expenditures of substantial amounts of energy. As a rule, the one claw is moved toward and away from the other claw by a cam and follower arrangement whereby the shaft must be driven with a force which suffices to ensure that the follower can move the one claw away from the other claw against the opposition of the respective spring or springs. The amounts of energy which are spent for maintaining the claws of the transporting units in open positions are especially great when the apparatus is employed for sidewise transport of thick-walled, long, large diameter metallic tubes; the apparatus then comprises a substantial number of axially spaced disks each of which supports two or more transfer units. Moreover, the wear on the faces of cams which cooperate with followers on the movable claws of the transfer units to hold such claws in open positions is rather extensive and the apparatus must embody a rather heavy, bulky and expensive frame structure.

SUMMARY OF THE INVENTION

An object of the invention is to provide a novel and improved apparatus for sidewise transport of tubes or analogous elongated workpieces wherein the wear on parts which move with reference to each other is less than in presently known apparatus and wherein the biasing means which urge the claws of transfer units into retaining engagement with workpieces need not be stressed (or are stressed only negligibly) when the claws do not engage and transport a tube or the like.

Another object of the invention is to provide an apparatus which can transport with equal facility shorter, longer, smaller diameter and larger diameter tubes or analogous workpieces of metallic or nonmetallic material and whose energy requirements are considerably less than in heretofore known apparatus for transport of similar goods.

A further object of the invention is to provide a novel and improved transfer unit which can be utilized in apparatus for sidewise transport of tubes or the like.

An additional object of the invention is to provide a transfer unit wherein the movable claw or claws need not be biased by springs or the like when not in engagement with a workpiece.

The invention is embodied in an apparatus for sidewise transport of rods, bars, tubes or like workpieces which comprises a preferably horizontal rotary drive shaft, at least one carrier fixed to and rotatable with the drive shaft, at least one transfer unit for each carrier and each including a first claw fixed to the respective carrier, a second claw having a first portion or arm movable toward and away from the first claw to respectively engage and release a workpiece between the first arm and the first claw, a second portion or arm, common pivot means provided on the carrier for the two arms, resilient means coupling the two arms, and follower means provided on the second arm, and fixed cam means tracked by the follower means and arranged to impart, during each revolution of the drive shaft, to the second arm at least one pivotal movement in a first direction to thus move the first arm toward the respective first claw by way of the resilient means and at least one pivotal movement in a second direction to thus move the first arm away from the respective first claw, again by way of the resilient means. Since the resilient means is used to transmit to the respective first arm motion in directions toward and away from the respective first claw, such resilient means is stressed mainly when the corresponding first arm engages a workpiece and urges it against the associated first claw. The stress on the resilient means is much less when the corresponding first arm is disengaged from the workpiece.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a transverse vertical sectional view of an apparatus which embodies the invention, showing a carrier with four transfer units.

DESCRIPTION OF THE PREFERRED EMBODIMENTS

The drawing shows a portion of an apparatus for sidewise transport of metallic tubes 2 or analogous workpieces. The apparatus comprises a base including a pair of profiled beams 1 supporting several longitudinally spaced upright columns 3, only one shown. A horizontal drive shaft 4 is mounted in the columns 3 and receives torque from a transmission or the like (not shown). The shaft 4 is fixedly connected with several axially spaced disk-shaped carriers 5 (only one shown) each of which supports one but preferably two or more transfer units. In the illustrated embodiment, each carrier 5 supports four equidistant transfer units and each of these transfer units comprises a first claw 6 having a prismatic socket 6a and fixedly secured to the respective carrier. Each transfer unit further comprises a second claw having two portions or arms 7, 7a which can turn about the axis of a common pivot pin 8 provided on the respective carrier 5. The arm 7 is pivotable by the arm 7a toward and away from the associated claw 6 to respectively engage or release a tube 2 which is received in the socket 6a. Helical springs 9 or analogous resilient means are provided to couple each arm 7 to the respective arm 7a, and the arms 7a carry roller followers 10 which extend into the endless groove of a fixedly mounted cam 11. The groove of the cam 11 has arcuate portions whose center of curvature is located on the axis of the shaft 4 (which is parallel to the pivot pins 8) and straight portions 11a, 11b.

A feeding device for delivery of tubes 2 into the path of movement of claws 6 comprises a rotary feed screw 12 which moves the tubes sideways, and a star wheel 13 mounted in the respective column 3 and serving to deliver successive tubes from the discharge end of the feed screw 12 into the path of movement of successive claws 6 on the rotating carrier 5.

The means for receiving tubes 2 from successive transfer units comprises a second feed screw 14 mounted on the base of the apparatus and serving to move the tubes sideways to storage or to other destination. Each tube 2 descends onto the feed screw 14 by gravity in response to opening of the claws in the respective transfer unit.

The operation:

When the roller follower 10 of the arm 7a in the transfer unit shown at a level directly below the drive shaft 4 enters the straight vertical portion 11a of the groove in the cam 11, the arm 7a pivots on the pin 8 in a counterclockwise direction because the distance between the roller follower 10 and the axis of the shaft 4 decreases. The socket 6a of the associated claw 6 engages from below a tube 2 between the adjacent teeth of the star wheel 13 and the spring 9 begins to move the arm 7 toward the adjacent claw 6 so that the arm 7 engages and holds the tube in the socket 6a. The roller follower 10 thereupon reaches an arcuate (uppermost) portion of the groove in the cam 11 while the arm 7a maintains the spring 9 under requisite stress to ensure satisfactory retaining action for the arm 7. The arm 7 is preferably provided with a rather shallow prismatic socket 107 which receives a portion of the tube 2 during travel of such tube about the axis of the shaft 4. The distance between the straight portion 11a of the groove in the cam 11 and the shaft 4 determines the amount of energy which the spring 9 stores while the corresponding arm 7 engages a tube 2 during transport about the shaft 4 (see the uppermost transfer unit).

When a roller follower 10 enters the portion 11b of the groove in the cam 11, it begins to move away from the shaft 4 and the corresponding transfer unit opens its claws to permit the tube to drop onto the feed screw 14. During such opening of claws, the arm 7 is moved away from the claw 6 by the spring 9 which dissipates energy in response to a clockwise pivotal movement of the arm 7a so that its stressing is less when the transfer unit does not transport a tube. The arms 7 and 7a carry posts or studs 15, 15a which engage with each other in fully closed positions of the claws to maintain the spring 9 under a small initial stress. Once the post 15 engages with the post 15a, the arms 7 and 7a pivot as a unit to maintain the socket 107 in a position at an optimum distance from the socket 6a when the transfer unit is ready to receive a fresh tube from the star wheel 13.

An important advantage of the improved apparatus is that the springs 9 are stressed less when the claws of the transfer units are disengaged from the tubes. Therefore, the stressing of the springs 9 depends only on the diameters of the tubes; such stressing decreases when the apparatus transports smaller diameter tubes. Consequently, the frame and the cams of the apparatus need not be as heavy and bulky as in conventional apparatus. Moreover, the wear on the cams is much less than in apparatus wherein the springs of the transfer units are stressed in response to opening of the claws. Furthermore, the torque required to rotate the drive shaft 4 is much less than in conventional apparatus.

It is clear that the number of and the distances between the carriers 5 will depend on the maximum length and weight of workpieces which are being transported in the apparatus.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In an apparatus for sidewise transport of tubes or like workpieces, a combination comprising a drive shaft; a carrier fixed to said shaft; at least one transfer unit including a first claw fixed to said carrier, a second claw having a first portion movable toward and away from said first claw to respectively engage and release a workpiece between said first claw and said first portion, a second portion, common pivot means provided on said carrier for said portions, resilient means coupling said portions, and follower means provided on said second portion; and cam means tracked by said follower means and arranged to impart, during each revolution of said shaft, to said second portion a pivotal movement in a first direction to thus move said first portion toward said first claw by way of said resilient means and a pivotal movement in a second direction to thus move said first portion away from said first claw by way of said resilient means.

2. A combination as defined in claim 1, wherein said first claw is provided with a prismatic socket for reception of a portion of a workpiece between said first claw and said first portion of the second claw.

3. A combination as defined in claim 1, wherein said resilient means comprises a helical spring which is stressed in response to engagement of the first portion of said second claw with a workpiece between said first portion and said first claw.

4. A combination as defined in claim 1, wherein said pivot means is parallel to said drive shaft.

5. A combination as defined in claim 1, further comprising feeding means for delivering workpieces sideways to that portion of the path for said first claw where the first portion of said second claw is remote from the first claw.

6. A combination as defined in claim 5, wherein said feeding means comprises at least one feed screw and at least one star wheel arranged to transfer workpieces from said feed screw to said portion of said path.

7. A combination as defined in claim 1, further comprising means for receiving workpieces from said transfer unit, said receiving means comprising at least one feed screw arranged to move the workpieces sideways.

8. A combination as defined in claim 1, wherein said carrier supports a plurality of transfer units.

9. A combination as defined in claim 1, wherein said pivot means is parallel to said shaft and said shaft is driven to rotate about a substantially horizontal axis.

10. A combination as defined in claim 1, wherein said portions of said second claw comprise means for maintaining said resilient means in slightly stressed condition when said first portion is disengaged from a workpiece.

* * * * *